J. C. TAPPAN.
VEHICLE ATTACHMENT.
APPLICATION FILED MAY 24, 1915. RENEWED FEB. 15, 1916.

1,198,084.  Patented Sept. 12, 1916.

Witness
C. D. B. N. Brown.

Inventor
J. C. Tappan,
By E. W. Bond
Attorney

UNITED STATES PATENT OFFICE.

JOSEPH C. TAPPAN, OF ALTON, NEW HAMPSHIRE.

VEHICLE ATTACHMENT.

1,198,084.

Specification of Letters Patent.

Patented Sept. 12, 1916.

Application filed May 24, 1915, Serial No. 30,110. Renewed February 15, 1916. Serial No. 78,534.

*To all whom it may concern:*

Be it known that I, JOSEPH C. TAPPAN, a citizen of the United States, residing at Alton, in the county of Belknap and State of New Hampshire, have invented certain new and useful Improvements in Vehicle Attachments, of which the following is a specification.

This invention relates to certain new and useful improvements in devices for supporting a litter or other device for the comfort of a sick person during transportation from one place to another.

The present invention has for its objects among others to provide a simple and efficient device detachably mountable upon the backs of seats of an automobile, a railway car, or other vehicle, and which shall be capable of mounting and demounting and taking apart with ease and stored beneath the seat or in the tool box.

It has also for a further object to provide simple and efficient means whereby the patient may be supported as upon a yielding base so that he or she may be subjected to the least possible vibration or jar.

It has for a further object to provide means whereby the socket members may be capped when the device is not in use so as not to mar the appearance of the vehicle.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1:
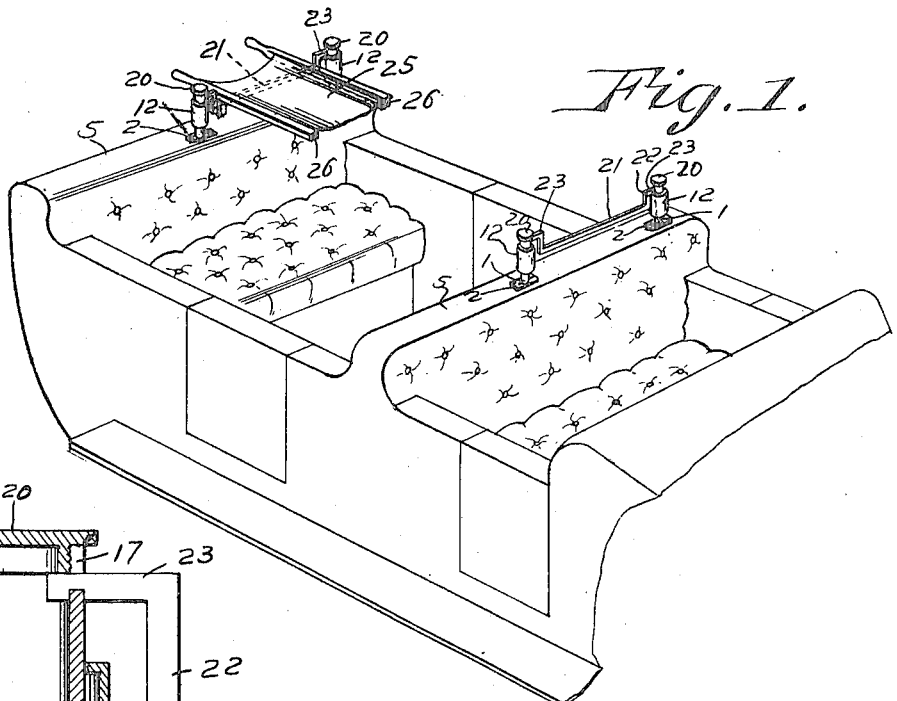
Figure 2:
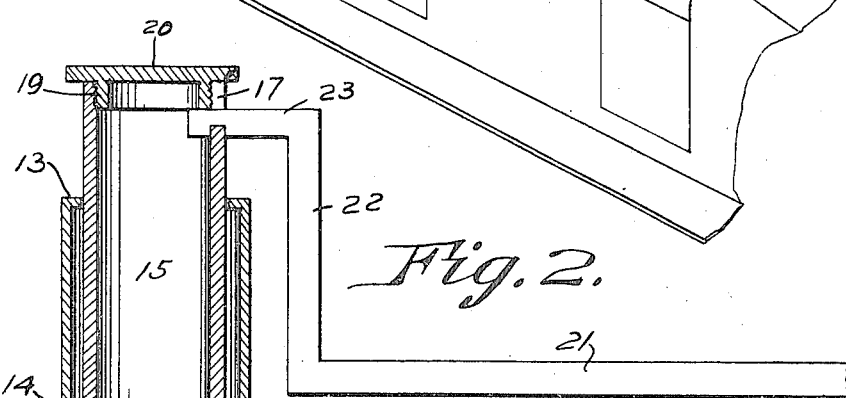
Figure 3:
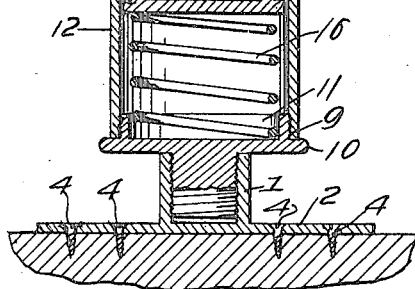
Figure 4:
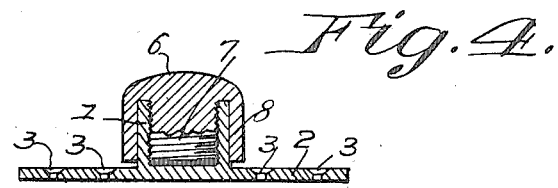
Figure 5:
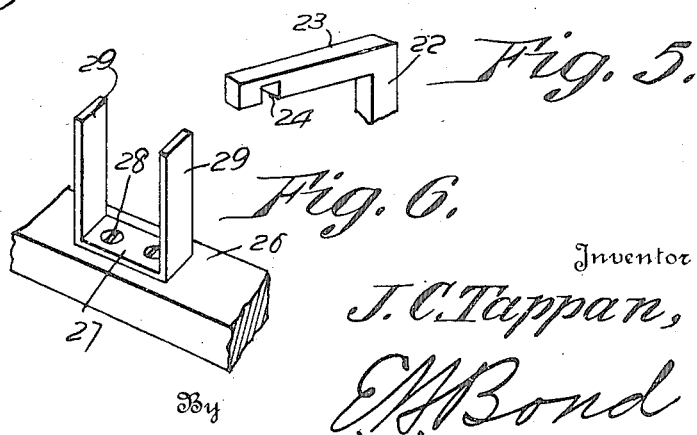
Figure 6:
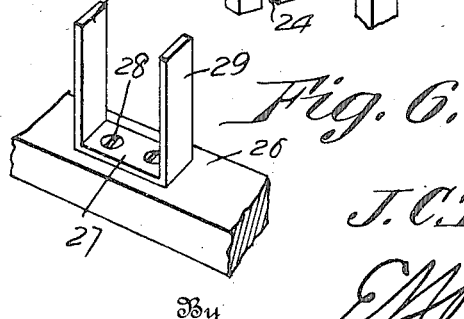

Figure 1 is a perspective view with portions broken away, showing the application of the present invention to an automobile body. Fig. 2 is an enlarged substantially central vertical section through one of the resilient supports with one of the cross arms in place and broken away. Fig. 3 is a perspective view of the upper portion of the inner cylinder with the cap removed. Fig. 4 is a vertical section showing the socket capped, as when the device is not in use. Fig. 5 is a perspective detail of one end of one of the cross bars. Fig. 6 is a perspective detail looking at the under side of one of the side bars of a litter.

Like numerals of reference indicate like parts throughout the several views.

In carrying out my invention I provide four resilient supports, as seen in Fig. 1, two being attachable to the top of two seats of an automobile or a railway car or other vehicle. As these supports are all alike, a description of one will suffice for all.

Referring to Fig. 2, 1 designates a socket internally threaded and rising from an attaching member 2 having holes 3 for the reception of the screws or other means 4 which may be employed to secure the same to the tops, backs or fronts of the seats 5, as seen in Fig. 1. When the device is not in use for the support of a litter, each of these sockets is closed by suitable means, as a cap 6, having a depending externally threaded portion 7 engaging the internal threads of the socket 1 and a depending annular flange 8 embracing said socket. When in use for supporting a litter or other rest for the patient, the caps 6 are removed and in lieu thereof I screw into each socket 1 the depending screw portion 9 of a flange member 10 having a vertical flange 11 externally threaded, as seen in Fig. 2, and designed to be embraced by the lower end of the outer cylinder 12, the lower end of which is internally threaded, as seen in Fig. 2, to engage the external threads of the portion 11. The upper end of this cylinder is provided with an inwardly extending flange 13 as seen in Fig. 2, which, by engagement with the flange 14 at the lower end of the inner cylinder 15, serves to prevent the withdrawal of the latter. This inner cylinder is designed to slide freely within the outer cylinder and is mounted upon a spring 16, the lower end of which is confined within the upturned flange 11, as shown. The upper end of the cylinder 15 is provided with a vertical slot 17, as seen in Figs. 2 and 3, the upper end of the cylinder 15 being internally threaded, as at 18, to receive the externally threaded depending portion 19 of a cap member 20, as seen in Fig. 2.

When it is desired to set up the support, the caps 6 are removed, the cylinders are put in place, as seen in Fig. 2, the caps 20 being removed and two cross rods or supports 21 are employed, each having at each end a vertical member 22 terminating in a short horizontal member 23 provided upon its under side near its free end with a notch 24. The rods are passed through the slots 17 of the upper ends of the cylinders 15 and the notches 24 engaged over the upper walls of the cylinders at the lower ends of the slots 17, as seen in Fig. 2, and then the caps 20 are applied, the flanges 17 bearing against the ends of the members 23 which extend within the cylinders 15 and thus the cross rods are firmly held in place, yet can be easily and quickly removed when desired. When thus in position, the cross rods are designed to support a litter, as 25, which may be of any well known type, or if a litter is not handy a plank or other means of supporting the patient may be placed upon the cross rods.

In order to prevent movement of the litter in the direction of its length, I affix to the under side of one of the side bars 26 thereof an inverted U-shaped member 27 secured thereto by screws or the like 28 and the depending arms 29 of which straddle one of the cross rods and thus hold the litter against endwise movement.

When not in use, the cylinders and cross rods may be demounted and stored under the seat or tied into a compact bundle, or kept in the tool chest, as may be found most expedient.

In use, the inner cylinders freely movable within the outer cylinders and supported upon the springs 16 afford a yielding rest for the patient which is most desirable in transferring the patient from one place to another, or even while at rest.

Modifications in details may be resorted to without departing from the spirit of the invention or sacrificing any of its advantages.

What is claimed as new is:—

1. In a device of the character described, a socket with attaching means, a member engageable with the socket, telescopic means supported by said member, a resilient member, and a cross rod having an end coöperating with one of said telescopic members.

2. In a device of the character described, a socket with attaching means, a member engageable with the socket, telescopic means supported by said member, an interposed spring and a cross rod having an end detachably engaged with one of the telescopic members.

3. In a device of the character described, a socket with attaching means, a member engageable with the socket, telescopic means supported by said member, an interposed spring, a cross rod having an end detachably engaged with one of the telescopic members, and means engageable with said telescopic members to hold the cross rods in position.

4. In a device of the character described, an attaching plate with a socket, a flange member detachably engaged with the socket, an outer cylinder detachably engaged with the flange member, an inner cylinder, a spring within the outer cylinder and upon which the inner cylinder rests, the inner cylinder having an open-ended slot at its upper end, and a detachable cap for said inner cylinder.

5. In a device of the character described, an attaching plate with a socket, a flange member detachably engaged with the socket, an outer cylinder detachably engaged with the flange member, an inner cylinder, a spring within the outer cylinder and upon which the inner cylinder rests, the inner cylinder having an open-ended slot at its upper end, a detachable cap for said inner cylinder, and a cross rod having a member with a notch upon its under side for coöperation with said slot and the bottom wall thereof.

6. In a device of the character described, an attaching plate with a socket, a flange member detachably engaged with the socket, an outer cylinder detachably engaged with the flange member, an inner cylinder, a spring within the outer cylinder and upon which the inner cylinder rests, the inner cylinder having an open-ended slot at its upper end, a detachable cap for said inner cylinder, a cross rod having a member with a notch upon its under side for coöperation with said slot and the bottom wall thereof, and a flanged cap member for said socket when the flanged member is removed.

In testimony whereof I affix my signature in presence of two witnesses.

JOSEPH C. TAPPAN.

Witnesses:
GEORGE H. JONES,
GEORGE B. SAMPSON.